United States Patent [19]

Eggert

[11] Patent Number: 4,982,129

[45] Date of Patent: Jan. 1, 1991

[54] SINGLE PHASE ASYNCHRONOUS MOTOR WITH TWO MAGNETIC POLES

[75] Inventor: Valmor Eggert, Joinville, Brazil

[73] Assignee: Empresa Brasileira de Compressores, Joinville, Brazil

[21] Appl. No.: 409,215

[22] Filed: Sep. 19, 1989

[30] Foreign Application Priority Data

Sep. 21, 1988 [BR] Brazil ............... 18804947

[51] Int. Cl.[5] ............................................ H02K 1/16
[52] U.S. Cl. ................................... 310/216; 310/254
[58] Field of Search ............... 310/166, 167, 193, 194, 310/216, 254

[56] References Cited

U.S. PATENT DOCUMENTS

3,783,318  1/1974  Widstrand ............... 310/216
3,942,055  3/1976  Hoffmeyer ............... 310/216

Primary Examiner—Steven L. Stephan
Assistant Examiner—Judson H. Jones
Attorney, Agent, or Firm—Darby & Darby

[57] ABSTRACT

A single phase asynchronous motor with two magnetic poles, of the type comprising a cage rotor and a stator having laminations provided with radial slots (A, B, C, D, E, F) and a main coil and an auxiliary coil each having coil turns, the turns of which are introduced in said slots. Slots (A) in the main coil axis (PP) adjacent to the slots (A, B, C, D, E) in the main coil have a reduced height at least in relation to the height of the adjacent slots (B) for the main coil, and said slots (A) of reduced height receive a number of coils lower at least than that which is received in said adjacent slots (B) in the main coil.

9 Claims, 7 Drawing Sheets

SINGLE PHASE ASYNCHRONOUS MOTOR WITH TWO MAGNETIC POLES

BACKGROUND OF THE INVENTION

This invention refers to a single phase asynchronous motor with two magnetic poles provided with a cage rotor and, more specifically, a new construction for the stator in a motor of said type.

Single phase asynchronous motors with two poles provided with a cage rotor have two windings, that is, the main and the auxiliary coils of the stator. The auxiliary coil is designed to overcome the resistant torque while the rotor is started and bring same to a rotation speed close to its synchronous rotation speed. At this time said coil is deenergized, and remains so until it is required to operate again due to an excessive overload or a new motor starting. This low utilization factor of the auxiliary coil makes it desirable that this auxiliary phase occupy a minimum space volume as possible in the motor and the material consumption thereof is as small as possible.

Figure 2:
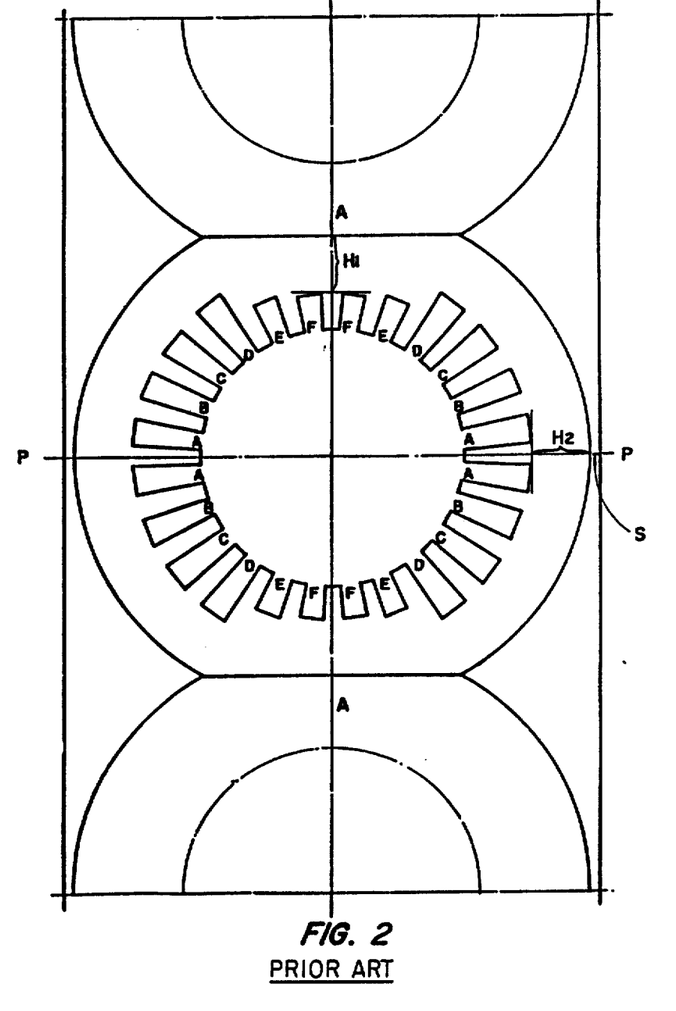
FIGS. 2 and 3 show two known plate configurations which are used in the described motor.
Figure 3:
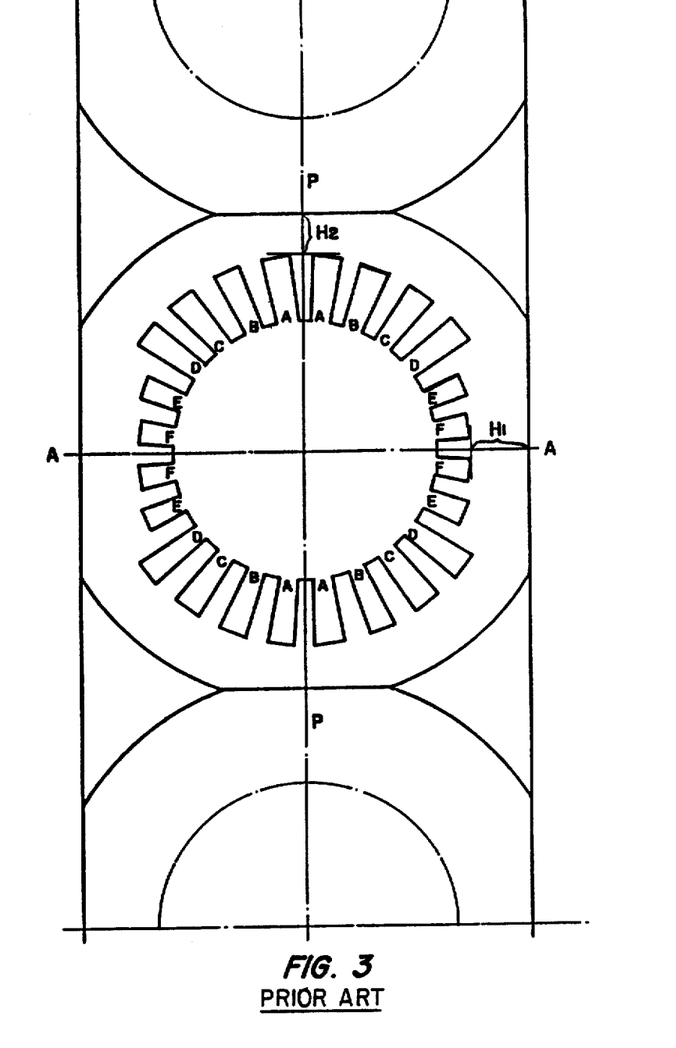

For these reasons, stator plates are die-stamped with slots in different sizes. FIGS. 2 and 3 in the attached drawings show two different configurations of plates usually employed and the die cutting layout thereof. As seen in FIG. 2, the height of the stator plate crown is not necessarily constant, since the magnetic flux density has its maximum value towards the slots in the main coil (PP axis), while the minimum value thereof is towards the slots in the auxiliary coil (AA axis). From this, it can be concluded that the crown height H1 of axis AA can be lower than the crown height H2 of axis PP without affecting the crown magnetic flux density.

This plate configuration although being optimum from the magnetic aspect, it is not economically satisfactory, since it inevitably produces material leftovers due to there being necessary scrap S between the strip edges and the plate contour (as shown in FIG.2) or between the plate contour (in this case the main coil slots are die-stamped towards the strip).

According to another known configuration of the plates, the material leftovers have been eliminated by die-stamping the plates with shaped-cuttings both towards the main coil slots (axis PP) and towards the auxiliary coil slots (axis AA) as illustrated in FIG. 3 for example. The axis PP could also be provided transversely to the longitudinal direction of the strip. In this configuration, the height $H_2$ of the crown is reduced as a function of the shape-cuttings in the direction transverse to axis PP.

This second configuration as illustrated in FIG. 3, although being satisfactory from the economical aspect, is far from the magnetic aspect, since a reduction is caused in the magnetic flux passage, directly towards the main coil slots (axis PP), where the field induction has its maximum value. This magnetic flux reduction towards the main coil slots (axis PP) increases the crown magnetic losses substantially thereby impairing the motor efficiency.

Therefore there is an obvious need to maintain the height of the crown on axis PP, this being only possible should the slot height under the circular arc at the PP axis ends be reduced, the same way as it is done for AA axis intermediate coil slots. However, the slot height of the main coil is determined by the number of coils to be introduced in the slot, the allocation of which conventionally complies with a sine distribution, which is illustrated as an example in FIG. 4 for a 24 slot stator.

Figure 4:
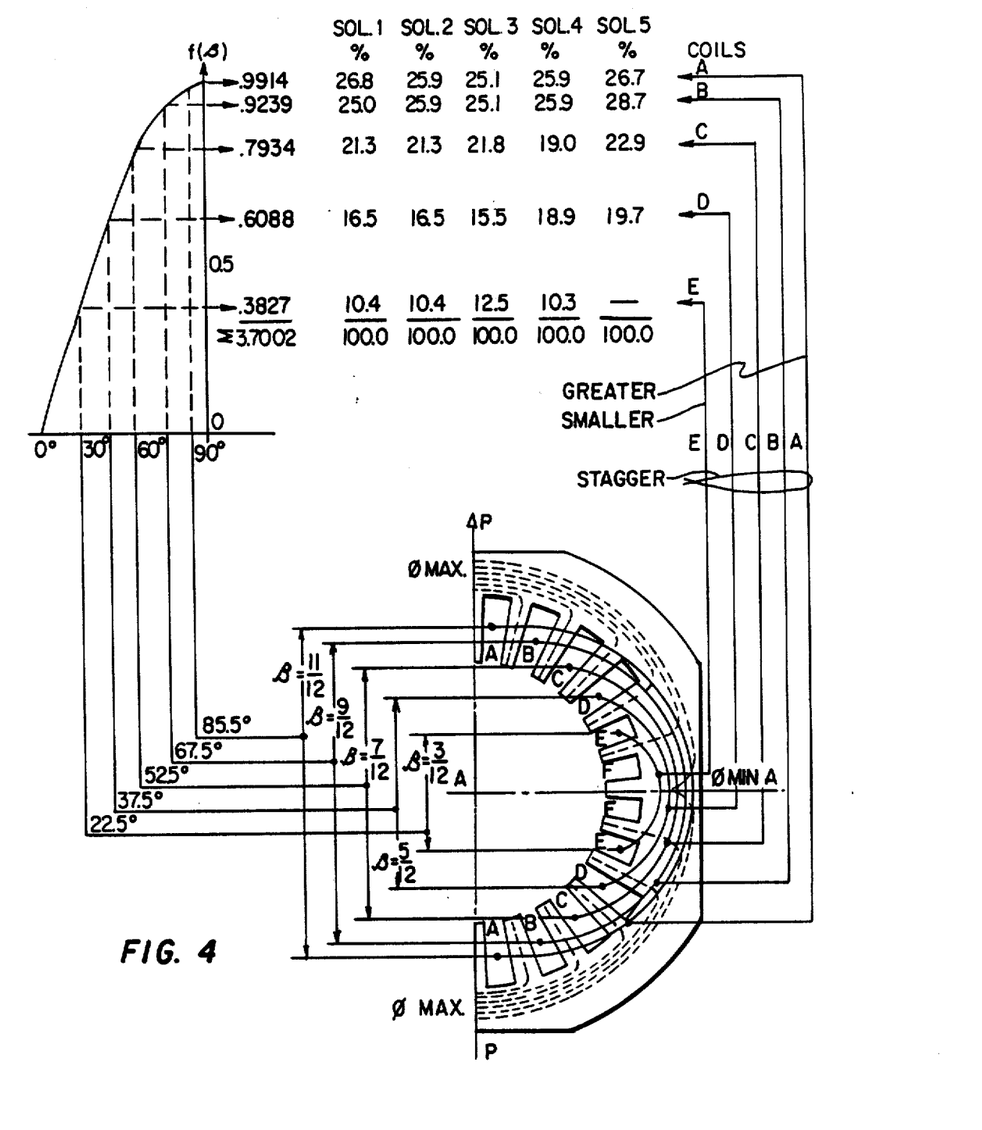
FIG. 4 shows diagrammatically the coil distribution as used conventionally in said motors.

In FIG. 4, at the right side of the axis PP there is a group of 5 coil turns in the main coil, where the coil turns A (greater), B, C, D and E (smaller) may be seen. Each coil turn takes a fraction of the polar pitch, that to a 24 stator slots varies from 11/12 (greater coil turn) to 3/12 (smaller coil turn). As illustrated in FIG. 4, the coil percentage allocated to each coil turn (A, B, C and E) is obtained by the relationship:

$$\text{Coils \%} = \frac{F(\beta) \text{ each coil turn } (A,B,C, \text{ and } E)}{\Sigma f(\beta) A, B, C, D \text{ and } E} \times 100$$

per coil turn

In this known distribution the function $f(\beta)$ is given by $$F(\beta) = \sin(90\beta)$$

where $\beta$ is the fraction of stator polar pitch.

It is an essential condition for the motor that the harmonic content in any coil distribution used, either sine or decreasing order, will be as low as possible.

Should the harmonic content in any order be higher than the harmonics of the slots, a loss of torque occurs mainly in rotations from zero to 75% synchronous rotation. Harmonics having high amplitudes also increase iron magnetic losses, therefore reducing the motor efficiency.

In FIG. 4 there is shown Example 1 identifying a simple sine distribution corresponding to the sines of the angles which are identified by the fraction of the polar pitch. In Examples 2 to 5 the coil turns A and B have the same coil percentages, without any harmonic content increase. Thus, the large slots are sized by the volume of the coil turns A and B, the filling factor depending upon the manufacturing process being used.

Depending on the degree of any error in the number of coils caused by the manufacturing process, we can have coils at A in a larger number than at B or at B larger than at A; this can give a difference caused by the equipment with 2 to 4 coils. In the coil turns C, D and E, it is not necessary that the distribution follows the sine curve as shown in Examples 2 to 4 in FIG. 4. In each example analyzed, the harmonic content is very low, within the tolerable extent, without adversely affecting the iron losses. In the case of FIG. 4, it is also common to use 4 coil turns per group (see Example 5), therefore simplifying the manufacture process and the tools involved.

In FIG. 4, slots E and F are smaller due to the small volume of the auxiliary coil. Slots A and B are only used for the main coil and slot F is used only for the auxiliary coil. Therefore, it is noted that in the prior art examples shown, the usually adopted coil distribution does not allow that the height of slots A and B in the main coil be reduced. Such impossibility is due to the large number of coils to be introduced into such slots.

OBJECTS OF THE INVENTION

The object of this invention is to provide a single phase asynchronous motor with two magnetic poles having a stator in a plate configuration which is satisfactory from the economic aspect and at the same time optimum under the magnetic aspect.

More specifically, it is another object of this invention to provide a motor of the type described above, having a stator in a plate configuration, in which the outer dimensions towards the main coil axis (PP axis) can be reduced without causing a magnetic flux reduction in the stator crown.

It is further an object of this invention to provide a motor of the type described above having a stator in plate configuration having outer dimensions towards the axis (PP) of the main coil reduced by a proper distribution of coils without causing the drawbacks hereinbefore mentioned.

BRIEF DESCRIPTION OF THE INVENTION

The single phase asynchronous motor with two magnetic poles of the invention, comprises a cage type rotor and a stator made up of a stack of plates (laminations) which are substantially annular. The plates are provided with radial slots arranged around the inner diameter and of a main coil and an auxiliary coil each having a certain number of coil turns the coils of which are introduced into said slots. The plates are provided with end circular segment shape-cuttings arranged towards the orthogonal axes of the slots of the main coil and the auxiliary coil.

According to this invention, the slots in the main coil adjacent to the axis of the slots in the main coil have a reduced height at least in relation to the height of the adjacent slot used for the main coil so as to keep the radial distance between the reduced height slots and said end circular segment shape-cuttings essentially equal to the radial distance between the adjacent slots in the main coil and the peripheral edges of the stator plates. The coil distribution is allocated in each winding turn of the main coil so as that said slots of reduced height receive a number of coils lower at least than that allocated in the adjacent slots in the main coil.

The reduction in height of the slots (in the main coil) circumferentially nearer to said axis makes for a coil distribution other than that usually used. In this new distribution other than that usually used. In this new distribution, the percentage of coils allocated in each turn of the main coil is expressed by a relationship as follows:

$$\text{Coils \%} = \frac{f(\beta, \theta) \text{ of Coil Turns}}{f(\beta, \theta) \text{ of Coil Turns}} \times 100$$

per coil turn where: $-f(\beta, \theta) = [\sin(90)\beta + \theta)]^x$, where

- $\beta$ is the fraction of the stator polar pitch,
- $\theta$ is a constant depending on the number of slots with reduced height and on the total number of slots in the plate, and
- $x$ is a function of $\beta$.

In a preferred form of the invention, the constant is defined by the relationship:

$$\theta = 540/NR.$$

NR being the number of the plate slots; and the exponent x is expressed by the polynomial $$x = 16 - 95\beta - 212\beta^2 - 129\beta^3$$

the function of which is $$(16 - 95\beta + 212\beta^2 - 129\beta^3) f(\beta,\theta) = \sin[(90\beta + 540/RN)].$$

In the proposed stator construction, the end plate dimensions towards the main coil axis (PP axis) can be reduced without causing any magnetic flux reduction on the crown axis PP, where the field induction has its maximum value. This is obtained by reducing the slot height in the main coil which are circumferentially located nearer to axis PP. In the new stator, the plate configuration is satisfactory from the economic aspect and optimum under the magnetic aspect. Thus, besides making it possible to use the same material (steel plate), the new construction does not affect the iron losses and therefore the motor efficiency as a function of a new coil distribution allocated in each main coil turn.

BRIEF DESCRIPTION OF THE DRAWINGS

This invention will hereinafter be described in reference to the attached drawings, in which.

DETAILED DESCRIPTION OF THE INVENTION

Figure 1:
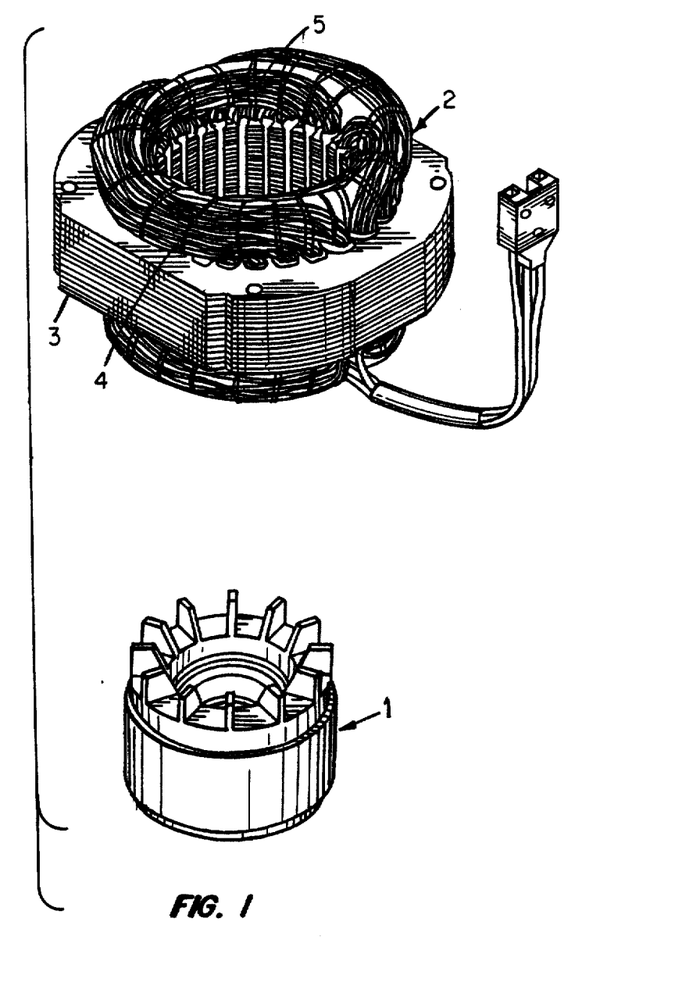
FIG. 1 is a detailed exploded perspective view of the main components of a single phase asynchronous motor with two magnetic poles.

As illustrated in FIG. 1, the electrical motor comprises a cage type rotor 1 and a stator 2. Stator 2 comprises a package or stack of plate laminations 3, a main coil 4 and an auxiliary coil 5.

Figure 5:
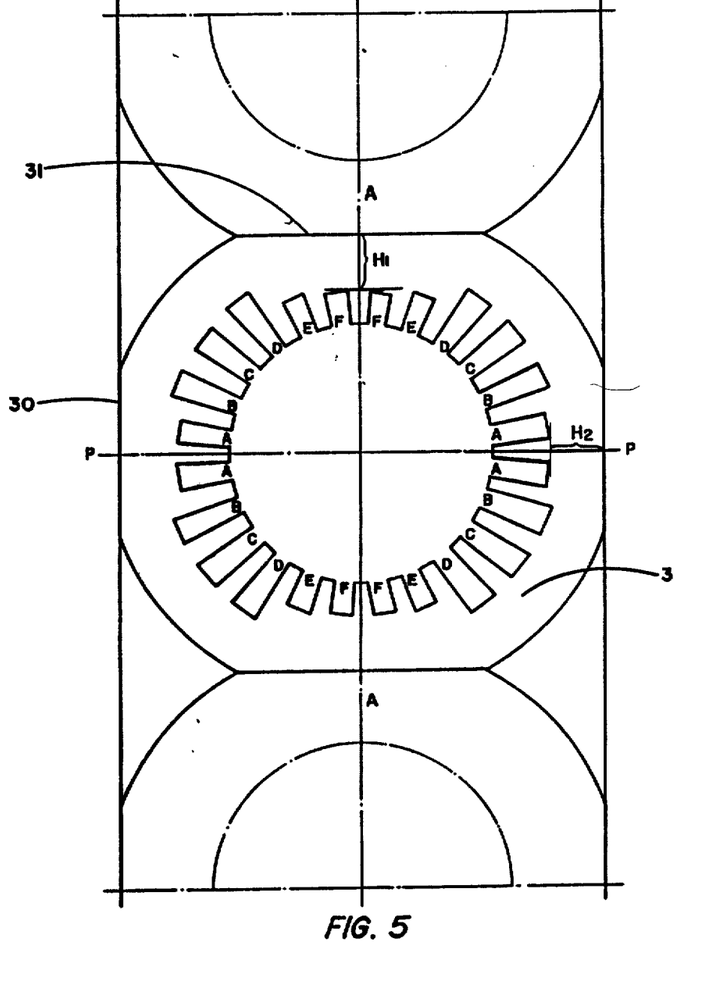
FIG. 5 shows the plate configuration of the present invention together with the cutting standard thereof.
Figure 6:
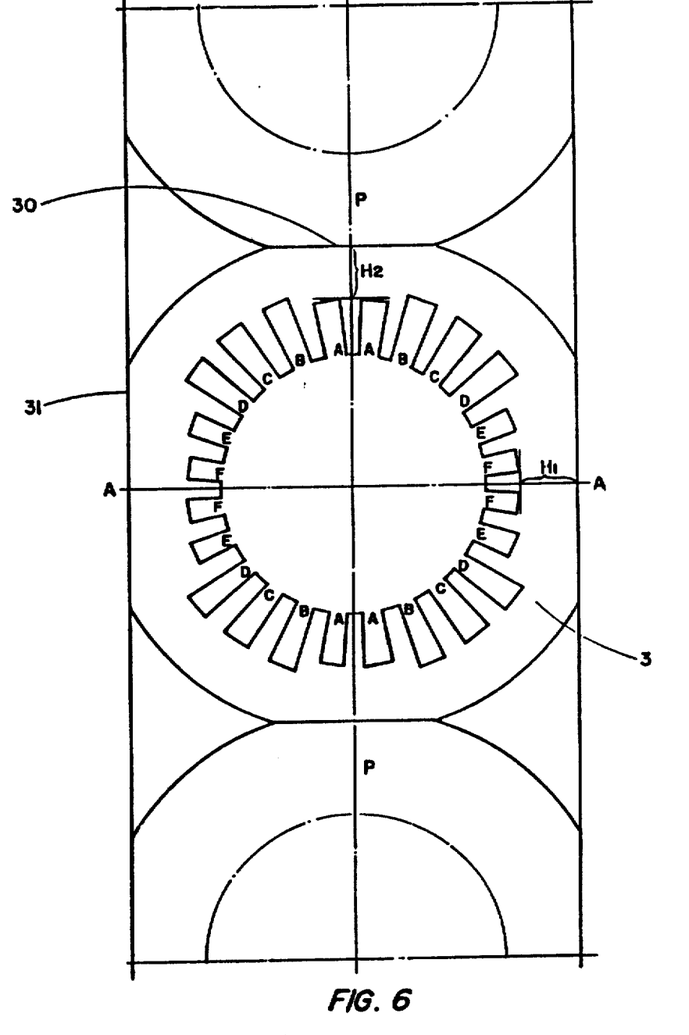
FIG. 6 shows a cutting standard variant for the plate configuration.

As illustrated in FIGS. 5 and 6, plates 3 are provided with 24 slots, being identified by letters A, B, C, D and F which are diametrically repeated and in which the coil turns of the main coil 4 and/or auxiliary coil 5 are introduced.

To simplify the process for manufacturing the plates 3, the slots A and E can be designed with same profile. Slots B, C and D have another profile and F a third profile. Therefore, three different slot profiles are used. Plates 3 are die-stamped having the end shape-cuttings 30 and 31 both towards the main coil slots (PP axis) and towards the auxiliary coil slots (AA axis).

In FIG. 5, slots A in the main coil are located under the end-shaped cuttings 30 (circumferentially nearer to axis PP) and have a reduced height in relation to slots B, C and D, which are located circumferentially away from the same axis towards axis AA. This reduction in the height of slots A allows that the end plate dimensions 3 are reduced without causing any increase to the stator crown magnetic losses, since contrary to the prior art (illustrated in FIG. 3), where the material leftovers were eliminated by reducing the crown height, in the proposed configuration said leftovers are eliminated without reducing the crown height (dimension H2).

The lower the slot height A, the higher is the possible reduction in the end plate sizes 3 without reducing the crown height (dimension H2). This height reduction in the slots A in the main coil (circumferentially nearer or adjacent to axis PP) is possible through the coil distribution as shown in FIG. 7.

Figure 7:
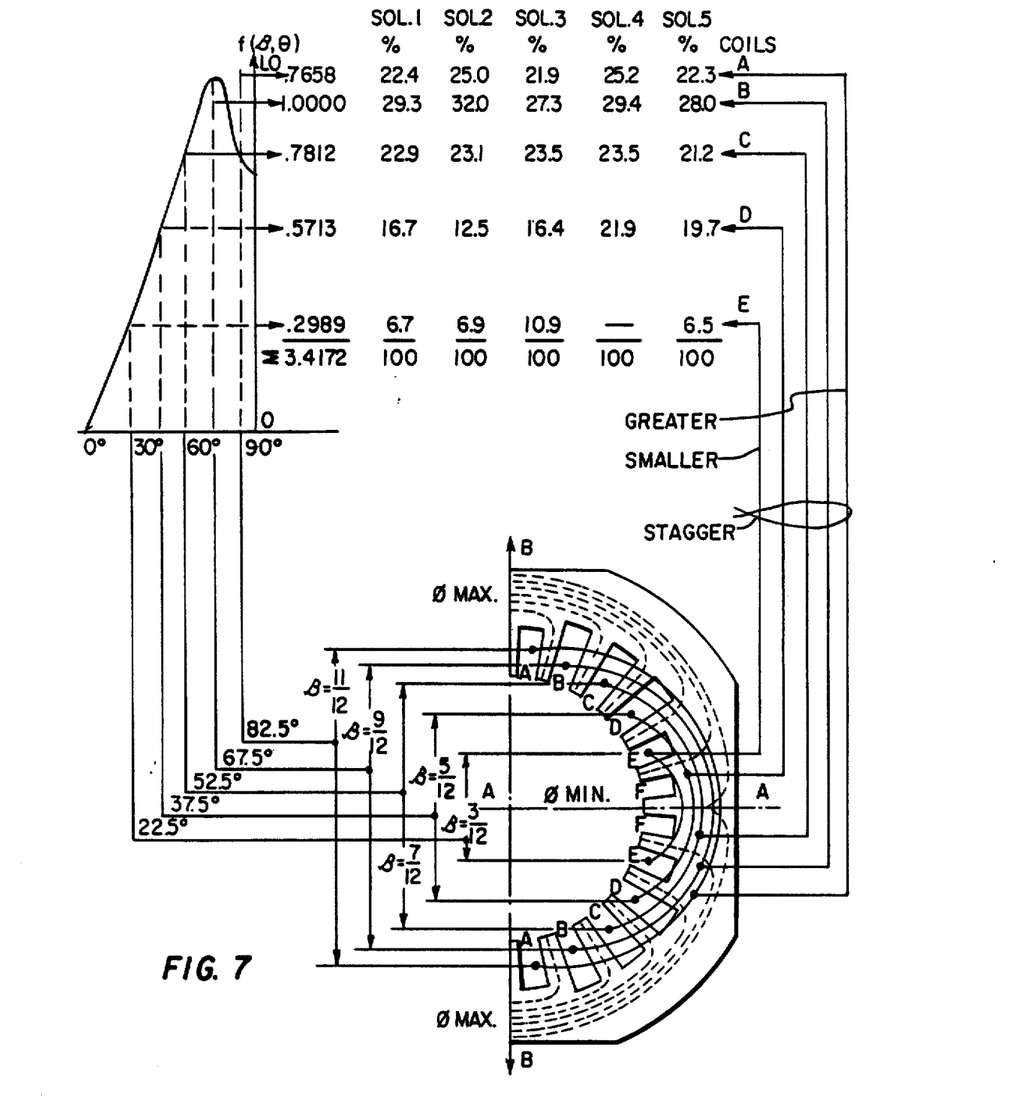
FIG. 7 shows diagrammatically the coil distribution as adopted for the proposed plate configuration.

FIG. 7 shows five examples of coil distribution applied to a 24 slot stator, where the number of coils in slot B is larger than is the slot A in the proportion of 16 to 31%. This allocation of a lower number of coils in the coil turns in slots A makes it possible to slightly reduce the wire volume in the stator, since contrary to the known art, a larger number of coils is allocated in the coil windings in the smaller perimeter slots B and C.

In the examples of the present invention, the odd upper order harmonics are nearly the same as the prior art, and there is no increase in the iron magnetic losses.

Another embodiment of the invention has slots A and F equal in height, as well as the slots B, C, D and E being equal for a distribution with five coil turns in the main coil 4 (see FIG. 7) and with three coil turns in the auxiliary coil 5.

Another embodiment with 24 slots is that where slots B, C and D are equal in height, slots E and F are equal and slot A has an average height between the two prior ones, for a distribution with four coil turns in the main coil 4 and in the auxiliary coil 5 (see FIG. 7).

Another embodiment having 20 slots is that where the slots A, B, C, E and F are provided without a slot D as those shown in FIGS. 5 and 6. The slots A and E are equal in height, slots B and C are equal and slot F is smaller in height than the two hereinbefore mentioned for a distribution with four coil turns in the main coil 4 and four or three coil turns in the auxiliary coil 5.

Another embodiment with 28 slots is that where the slots A, B, C, D, E and F have an extra slot C compared to those shown in FIGS. 5 and 6, where the slots A and E are equal to each other in height, slots B, C, C and B are equal, and a slot F smaller in the height than the two hereinbefore mentioned for a distribution with five or six coil turns in the main coil 4 and four to five coil turns in the auxiliary coil 5.

Although this invention has been described taking into account plates with 20, 24, and 28 slots, it is to be understood that the concepts thereof apply to the plates having different numbers of slots.

Other combinations of different numbers of coil turns in the main coil and auxiliary coils as well as other combinations of profiles of slots are also applicable to this invention.

What is claimed is:

1. A single phase asynchronous electric motor comprising:
    a rotor,
    a stator,
    at least one generally annular plate provided with a plurality of radial slots extending from the plate inner diameter,
    a main coil and an auxiliary coil each aligned relative to a respective axis with the axes being orthogonal to each other, each coil having at least one turn the coils of which are introduced in the slots of the plate,
    the outer diameter of the plate formed with cut edge segments on the orthogonal axes of the main and auxiliary coils,
    the slots for the main coil closest to the main coil axis being reduced in height relative to adjacent slots for the main coil so as to maintain the radial distance between the main coil reduced height slots and the corresponding end segments substantially equal to the radial distance between the adjacent main coil slots and the peripheral outer edge of the plate.

2. A motor as in claim 1 wherein the coil distribution of the turns of the main coil is such that the coils in the slots of reduced height are fewer in number than in the adjacent slots.

3. A motor according to claim 1, wherein the percentage of coils allocated on each turn of the main coil are expressed by a relationship as follows:

$$\text{Coils \%} = \frac{f(\beta, \theta) \text{ of the turn}}{\Sigma f(\beta, \theta) \text{ of the turn}} \times 100$$

per turn where: $-f(\beta, \theta) = \sin(90\beta + \theta)^x$,
- is the fraction of the stator polar pitch,
- $\theta$ is the constant depending on the number of slots having a reduced height and on the total number of the plate slots, and
- $x$ is a function of $\beta$.

4. A motor according to claim 2, wherein the percentage of coils allocated on each turn of the main coil are expressed by a relationship as follows:

$$\text{Coils \%} = \frac{f(\beta, \theta) \text{ of the turn}}{\Sigma f(\ , \theta) \text{ of the turn}} \times 100$$

per turn where: $-f(\beta, \theta) = \sin(90\beta + \theta)^x$,
- is the fraction of the stator polar pitch,
- $\theta$ is the constant depending on the number of slots having a reduced height and on the total number of the plate slots, and
- $x$ is a function of $\beta$.

5. A motor according to claim 3, wherein the functions $f(\beta, \theta)$ defining the percentage of allocated on each coil turn (A, B, C and E) of the main coil are expressed by $F(\beta, \theta) = [\sin(90\beta + 540/NR)]^{(16-95\beta+212-\beta^2-129\beta^3)}$ being the fraction of the stator polar pitch and NR is the number of slots in the stator.

6. A motor according to claim 4, wherein the functions $f(\beta, \theta)$ defining the percentage of allocated on each coil turn (A, B, C and E) of the main coil (4) are expressed by $F(\beta, \theta) = [\sin(90\beta + 540/NR)]^{(16-95\beta+212-\beta^2-129\beta^3)}$ being the fraction of the stator polar pitch and NR is the number of slots in the stator.

7. A motor according to claim 1 wherein the slots for the auxiliary coil closest to the auxiliary coil axis are of lesser height than the said adjacent slots for the mail coil.

8. A motor according to claim 7 wherein the said slots for the auxiliary coil closest to the auxiliary coil axis are of lesser height than said lesser height slots of said main coil slots.

9. A motor as in claim 7 wherein the radial distance of the reduced height main coil slots is substantially equal to the radial distance between the end segments of the auxiliary coil axis and the auxiliary coil slots of the auxiliary coil.

* * * * *

UNITED STATES PATENT AND TRADEMARK OFFICE
CERTIFICATE OF CORRECTION

PATENT NO. : 4,982,129
DATED : January 1, 1991
INVENTOR(S) : Valmor Eggert It is certified that error appears in the above—identified patent and that said Letters Patent is hereby corrected as shown below:

ON THE TITLE PAGE:

Item [73] : change Assignee's name from "Empresa Brasileira de Compressores" to --Empresa Brasileira de Compressores S.A. - EMBRACO--.

Signed and Sealed this

Ninth Day of February, 1993

Attest:

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO. : 4,982,129
DATED : January 1, 1991
INVENTOR(S) : Valmor Eggert

It is certified that error appears in the above-indentified patent and that said Letters Patent is hereby corrected as shown below:

In the cover page of the patent, (73), please delete "Empresa Brasileira De Compressores S. A." and substitute therefor --Empresa Brasileira de Compressores S.A. - EMBRACO--.

Signed and Sealed this

Eighteenth Day of October, 1994

Attest:

BRUCE LEHMAN

*Attesting Officer*  *Commissioner of Patents and Trademarks*